United States Patent Office 3,702,324
Patented Nov. 7, 1972

3,702,324
3,4,5-TRIMETHOXYBENZAMIDES OF SUBSTITUTED ANILINES AND OF ALKYLPIPERIDINES
Wilfred A. Skinner, Portola Valley, John G. Johansson, Palo Alto, and Howard L. Johnson, Sunnyvale, Calif., assignors to Stanford Research Institute, Menlo Park, Calif.
No Drawing. Filed June 24, 1970, Ser. No. 49,201
Int. Cl. C07d 29/30
U.S. Cl. 260—293.53
4 Claims

ABSTRACT OF THE DISCLOSURE 3,4,5-trimethoxybenzamides of alkyl-substituted piperidines and aminopiperidines and of anilines substituted by such groups as alkyl, alkyloxy, thioalkyloxy, halo and nitro. These compounds are relatively non-toxic and are useful for pharmacological purposes. They exert a specific effect on the central nervous system and a somewhat lesser effect on muscle function, and thus have utility as tranquilizers.

SUMMARY OF THE INVENTION

The novel compounds of this invention are 3,4,5-trimethoxybenzamides of nitrogen-containing compounds selected from the group consisting of alkylpiperidines, amino-substituted alkylpiperidines, (aminoalkyl)-piperidines, substituted anilines wherein the substituent group is an alkyl, alkoxy, thioalkoxy, halo, nitro, or oxyacetic acid (—$OCH_2COOH$) group, together with alkylene-linked piperidyl and anilino groups. As employed herein, the term "alkyl" designates $C_1$–$C_3$ groups including methyl, ethyl, propyl and isopropyl, while the term "alkylene" designates $C_1$–$C_3$ groups including methylene, ethylene, propylene and trimethylene.

The piperidine amides and diamides of the invention have the formula

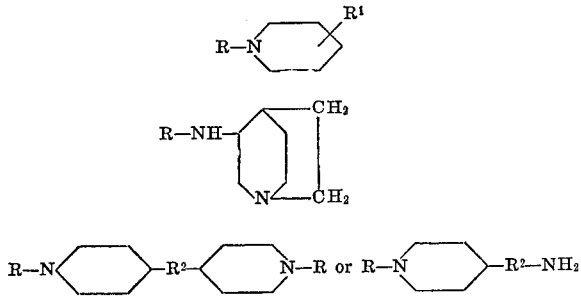

wherein R represents the 3,4,5-trimethoxybenzoyl radical, and $R^1$ and $R^2$ represent $C_1$–$C_3$ alkyl and alkylene radicals, respectively, as said terms have been defined above.

The aniline amides coming within the scope of the invention have the formula

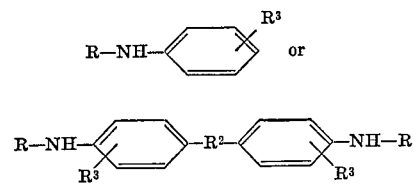

wherein R and $R^2$ are as defined above, and wherein $R^3$ represents a member selected from the group consisting of alkyl, alkoxy, thioalkoxy, nitro, halo and oxyacetic acid (—$OCH_2COOH$).

The novel compounds of this invention are solids ranging in color from white to yellow to purple, which have distinct melting points and are of moderate to good solubility in benzene, petroleum ether, ethyl ether, ethanol and other organic solvents. They are substantially insoluble in water. All are relatively non-toxic and have utility in pharmacological applications. Thus, they are well adapted to be employed in living mammals as tranquilizers for the treatment and control of anxiety, excessive aggressiveness and hyperactivity.

The compounds of the present invention can be prepared by reacting 3,4,5-trimethoxybenzoyl chloride with the appropriate anilino or piperidyl, nitrogen-containing reactant. In one such method, the said benzoyl chloride compound is reacted with the nitrogen-containing reactant in the presence of potassium carbonate or sodium carbonate in a solvent such as benzene, there being employed in this method approximately one mole of the benzoyl chloride compound for each reactive amine moiety of the nitrogen-containing reactant. The reaction mixture is stirred at room temperatures for about one-half to four or more hours, following which the solution may be heated under reflux conditions for an additional period of about one-half to two or more hours, if desired. In many cases the desired product will come out of solution in some measure and can be recovered by filtration. In other cases the solvent is distilled off leaving the product as a residue. Conventional means such as washing and recrystallization can be employed to work up the crude product and obtain the same in a pure form.

In the other method of preparation, the 3,4,5-trimethoxybenzoyl chloride is reacted with an excess of the nitrogen-containing reactant, the excess serving to take up the hydrogen chloride by-product which is formed during the reaction. In this method, the reactants are dissolved in a solvent such as benzene and the reaction mixture is then refluxed for several hours, following which the product is recovered and purified by conventional methods as indicated in the case of the method described above.

The 3,4,5-trimethoxybenzoyl chloride employed as a starting material is available commercially. It can be prepared in conventional fashion by reacting 3,4,5-trimethoxybenzoic acid with an excess of thionyl chloride in a solvent such as benzene. The reaction proceeds readily as the solution is refluxed for several hours, and the product can be recovered as the reaction mixture is evaporated to dryness in vacuo. If desired, the solid product so obtained can be taken up in additional quantities of the solvent, followed by the evaporation step, with this processing sequence being repeated until all of the excess thionyl chloride has been decomposed and distilled from the desired 3,4,5-trimethoxybenzoyl chloride product.

The great majority of the nitrogen-containing anilino and the piperidyl reactants are available commercially and can be prepared by the practice of conventional methods known to those skilled in the art. Thus, the alkyl-substituted piperidine compounds can be prepared by methods described in Beilstein $20^2$, 1, 13 and 57. (Aminoalkyl)-piperidines can be prepared by conventional methods from hydroxypiperidines (taught in Beilstein $21^2$, 9, 10), the reaction proceeding through the corresponding chloro derivative formed by reacting the hydroxy compound with phosphorous trichloride, followed by replacement of the chlorine atom with the amino radical as the chloride is heated with ammonia in a sealed vessel under autogenous pressures. Alkylene-linked piperidyl nucleae can be prepared from alkylene-linked piperidine-precursor nucleae by the practice of methods analagous to those recited above.

The various o-, m- and p-methoxyanilines, (anisidines) can be prepared by reduction of 2-nitroanisole with tin and hydrochloric acid, by methylation of m-aminophenol and of m-acetylaminophenol and by reduction of p-nitroanisole with alcoholic ammonium sulfide. Similarly, the corresponding thiomethoxy derivatives can be prepared by amination of the corresponding thioalkoxybenzene derivatives with methylhydroxylamine in the presence of aluminum trichloride.

The aniline compounds which are substituted by an oxyacetic acid group (—OCH$_2$COOH) can be prepared by reacting the corresponding sodium oxide aniline derivative with an ester of bromoacetic acid, and then forming the free acid group by hydrolysis of the ester. Nitroanilines can be prepared by nitration of aniline or by reduction of dinitrobenzene compounds. The p-nitroaniline compounds can be prepared from acetanilide using methods of U.S. Patent No. 2,406,578. Chloroanilines can be prepared by reduction of the corresponding chloronitrobenzene compounds with iron filings and hydrochloric acid. Fluoroaniline can be prepared by reduction of the corresponding fluoronitrobenzene using Raney nickel. Bromoaniline can be prepared by the direct bromination of aniline, while methods for preparing iodoanilines are described in Beilstein 12$^2$, 360, 361.

DESCRIPTION OF PREFERRED EMBODIMENTS

The following examples are merely illustrative of the invention and are not to be construed as limiting.

Example 1.—3,4,5-trimethoxybenz-
amide of 2-methylpiperidine

A solution of 1.1 ml. (0.01 mole) of 2-methylpiperidine in 25 ml. of benzene is admixed with 1.0 g. (0.0043 mole) of 3,4,5-benzoyl chloride. The solution is refluxed for two hours, following which water is added and the resultant organic and aqueous layers are separated. The organic layer is treated first with 3 N hydrochloric acid and then with saturated sodium bicarbonate solution, after which it is dried using magnesium sulfate and evaporated to dryness under vacuum. There is recovered a clear syrup which, when chilled, forms a white crystalline product having a melting point of 67–68° C. Elemental analysis confirms that the product is a compound corresponding to the above caption. C, H, N; found (percent): 65.14, 7.87, 4.71; calculated (percent): 65.51, 7.90 and 4.78.

Example 2.—3,4,5-trimethoxybenz-
amide of p-fluoroaniline

To a solution of 0.95 ml. (0.01 mole) of p-fluoroaniline in 25 ml. benzene is added 1 g. (0.0043 mole) of 3,4,5-trimethoxybenzoyl chloride. The solution is maintained under reflux conditions for two hours, after which the precipitate which forms in the reaction mixture is filtered off and washed first with water and then with benzene. The washed solid is recrystallized from benzene and dried with magnesium sulfate, yielding a purple solid having a melting point of 170–171.5° C. Elemental analysis confirms that the product is a compound corresponding to the above caption. C, H, N; found (percent): 62.83, 5.53, 4.80; calculated (percent): 62.94, 5.28 and 4.59.

Example 3.—3,4,5-trimethoxybenz-
amide of p-thiomethoxyaniline

To a solution of 1.4 g. (0.01 mole) of p-thiomethoxyaniline in 30 ml. of benzene is added 1.0 g. (0.0043 mole) of 3,4,5-trimethoxybenzoyl chloride. The solution is refluxed for two hours, following which the insoluble material present is filtered off and washed first with water and then with benzene. There is recovered an off-white product having a melting point of 144–145° C. which elemental analysis confirms as having a composition corresponding to that of the captioned compound. C, H, N; found (percent): 61.21, 5.78, 4.37; calculated (percent): 61.24, 5.74 and 4.20.

Example 4.—3,4,5-trimethoxybenz-
amide of o-toluidine

To a solution of 1.07 ml. (0.01 mole) of o-toluidine in 30 ml. of benzene is added 1 g. (0.0043) of 3,4,5-trimethoxybenzoyl chloride. The solution is refluxed for two hours, following which the precipitate present in the reaction mixture is filtered off, washed with water and then with benzene. It is recrystallized from a mixed benzene-cyclohexane solution to recover a white powdered product having a melting point of 138.5–139° C. Elemental analysis confirms the material to have a composition corresponding to that of the captioned compound, C, H, N; found (percent): 67.95, 6.40, 4.87; calculated (percent): 67.76, 6.36 and 4.65.

Example 5.—3,4,5-trimethoxybenz-
amide of 3-aminoquinuclidine

The compound 3 - aminoquinuclidine·dihydrochloric acid is converted to the free base by neutralization with sodium hydroxide. To a solution of 1.31 g. (0.01 mole) of the free base in 25 ml. of benzene is added 1.0 g. (0.0043 mole) of 3,4,5-trimethoxybenzoyl chloride. The solution is refluxed for 2.5 hours, following which it is diluted with 25 ml. water. The precipitate present in the reaction mixture is filtered off and washed first with water and then with benzene, after which it is recrystallized from a mixed benzene-ethanol solvent to yield a white crystalline product having a melting point of 195–197° C. Elemental analysis confirms the material as having a composition corresponding to the captioned compound. C, H, N; found (percent): 63.84, 7.48, 8.51; calculated (percent): 63.73, 7.55 and 8.74.

Example 6.—3,4,5-trimethoxybenzamide of p-nitroaniline

To a suspension of 1.38 g. (0.01 mole) of p-nitroaniline in 25 ml. of benzene is added 1 g. (0.0043 mole) of 3,4,5-trimethoxybenzoyl chloride. The reaction mixture is refluxed for five hours, after which the solid product which is present is filtered off and washed first with water and then with benzene. It is recrystallized from a mixed benzene-ethanol solvent, thereby recovering a yellow solid having a melting point of 192–193° C. Elemental analysis confirms that the product corresponds to the captioned compound. C, H, N; found (percent); 58.03, 4.89, 8.48; calculated (percent): 57.83, 4.85 and 8.43.

Example 7.—3,4,5-trimethoxybenzamide of p-anisidine

To a solution of 1.25 g. (0.01 mole) of p-anisidine (4-methoxyaniline) in 20 ml. benzene is added 1 g. (0.0043 mole) of 3,4,5-trimethoxybenzoyl chloride. The solution is refluxed for two hours, after which there is filtered off a solid product which is washed first with water and then with benzene. There is obtained a white crystalline solid having a melting point of 158.5–159.5° C. which elemental analysis discloses as having a composition corresponding to the captioned compound. C, H, N; found (percent): 64.54, 5.98, 4.62; calculated (percent): 64.34, 6.04 and 4.41.

Example 8.—3,4,5-trimethoxybenzamide of o-anisidine

To a solution of 1.12 ml. (0.01 mole) of o-anisidine in 20 ml. benzene is added 1 g. (0.0043 mole) of 3,4,5-trimethoxybenzoyl chloride. The solution is refluxed for two hours, after which 20 ml. water is added. The resulting organic layer is separated and extracted first with 3 N hydrochloric acid, then with saturated sodium bicarbonate and finally with water. The washed organic layer is dried with magnesium sulfate and evaporated to dryness under vacuum. There is obtained a syrup which crystallizes on standing to yield a solid which, when recrystallized from a mixed benzene-cyclohexane solvent, is a white material having a melting point of 115–116° C. Elemental analysis of the product is consistent with captioned compound. C, H, N; found (percent): 64.24, 6.05, 4.61; calculated (percent): 64.34, 6.04 and 4.41.

Example 9.—3,4,5-trimethoxybenzamide of 2,2'-dinitro-
4,4'-diaminodiphenylmethane To a solution of 1.9 g. (0.006 mole) of 2,2'-dinitro-4,4'-diaminodiphenylmethane in 50 ml. tetrahydrofuran is added 2.8 g. (0.013 mole) of 3,4,5-trimethoxybenzoyl chloride in approximately 20 ml. benzene. The solution is allowed to stand at room temperatures for four hours, after which the solid material present is filtered off and recrystallized from a mixed dioxane-water solvent. There is obtained a white solid having a melting point of 254–255.5° C. which elemental analysis confirms to have a composition corresponding to the captioned compound. C, H, N; found (percent): 58.42, 4.93, 8.34; calculated (percent): 58.5, 4.77 and 8.30.

Example 10.—3,4,5-trimethoxybenzamide of 4-(aminomethyl)-piperidine

A solution is prepared in 100 ml. benzene of 2.28 g. (0.02 mole) of 4-aminomethyl)-piperidine, 9.35 g. (0.04 mole) of 3,4,5-trimethoxybenzoyl chloride and 10 g. of potassium carbonate. This solution is stirred at room temperature for three hours, followed by a two hour refluxing period. The solution is then evaporated to dryness and washed first with 5% sodium carbonate and then with 5% hydrochloric acid. The washed solid is recrystallized from a mixed ethanol-water solvent to recover a white solid product having a melting point of 173.5–175° C. Elemental analysis confirms the material to have a composition corresponding to the captioned compound. C, H, N; found (percent): 61.94, 6.76, 5.66; calculated (percent): 62.13, 6.82 and 5.58.

Example 11.—3,4,5-trimethoxybenzamide of trimethylenepiperidine

A solution is prepared in 100 ml. benzene of 4.21 g. (0.02 mole) of trimethylenepiperidine, and 9.23 g. (0.04 mole) of 3,4,5-trimethoxybenzoyl chloride and 10 g. of potassium carbonate. This solution is stirred at room temperature for three hours, then heated under reflux conditions for two hours, and finally stripped of solvent. There is obtained a yellow oil residue which is taken up in a mixed benzene-petroleum ether solvent from which is recrystallized a white crystalline product having a melting point of 76–78° C. Elemental analysis confirms that the material corresponds to the captioned compound. C, H, N; found (percent): 66.5 (average of 2 determinations), 7.82, 4.79; calculated (percent): 66.20, 7.74 and 4.68.

Example 12.—3,4,5-trimethoxybenzamide of (3-aminophenoxy)-acetic acid 1.67 g. of (3-aminophenoxy)-acetic acid (0.01 mole) is dissolved in an aqueous solution of sodium carbonate. The resulting solution is then cooled and to it is added 2.31 g. (0.01 mole) of 3,4,5-trimethoxybenzoyl chloride. The solution is stirred at room temperature for three hours, after which the precipitate present is filtered off and recrystallized from a mixed ethanol-water solvent to recover a white solid having a melting point of 188–189.5° C. Elemental analysis confirms that the material has a composition corresponding to the captioned compound. C, H, N; found (percent): 59.99, 5.41, 3.94; calculated (percent): 59.83, 5.30 and 3.88.

Example 13.—3,4,5-trimethoxybenzamide of p-chloroaniline

Following the procedure of Example 2, 3,4,5-trimethoxybenzoyl chloride is reacted with p-chloroaniline to produce the captioned compound having a molecular weight of 321.76.

Example 14.—3,4,5-trimethoxybenzamide of (4,4′-diamino)-phenylethylene

Following the procedure of Example 9, 3,4,5-trimethoxybenzoyl chloride is reacted with (4,4′-diamino)-phenylethylene to produce the captioned compound having a molecular weight of 600.68.

Example 15.—3,4,5-trimethoxybenzamide of 4-n-propylpiperidene

Following the general method of Example 1, 3,4,5-trimethoxybenzoyl chloride is reacted with 4-n-propylpiperidene to produce the captioned compound having a molecular weight of 320.41.

Example 16.—3,4,5-trimethoxybenzamide of o-isopropylaniline

Following the general method of Example 7, 3,4,5-trimethoxybenzoyl chloride is reacted with o-isopropylaniline to produce the captioned compound having a molecular weight of 329.40.

The compounds of this invention are useful as sedatives and are characterized, in general, by the fact that their effects on coordinated motor activity are independent of their efforts on uncoordinated motor activity. Thus, when administered either orally or by injection into a mammal, said compounds are capable of providing a sedative effect without at the same time inducing a corresponding degree of impairment in coordinated motor activity. This combination of properties makes the compounds well adapted to be employed in the treatment of anxiety states, excessive aggressiveness and hyperactivity.

In evaluating the degree and type of central nervous system depression exerted thereby, the compounds hereof administered to mice and the resultant effects were determined by the photocell-activity-cage (uncoordinated motor activity) and the roto-rod (coordinated motor activity) methods. These methods are essentially those which are described by Kinnard and Carr, Jnl. Pharmacol. Exptl. Therapy, 121, 354 (1957). In carrying out these determinations, male albino mice (17–20 g.) of a Swiss-Webster strain were utilized, and were used only once. All drugs were administered intraperitoneally as suspensions in 10% Tween 80 in 0.9% saline (0.2 ml). Photocell activity was determined as cumulative counts over a 1 hour period beginning 0.5 hour after administration of drug or vehicle to groups of five mice. Activity was determined for one control group with each two treatment groups. Values for the latter were calculated as percentages of the former and are so expressed in the following table. Rotarod performance times were determined in groups of five trained mice 0.5 hour after administration of drug or vehicle. Mean performance time for control groups was 113.9 sec. and rod rotation was at the rate of 15 r.p.m. The mean performance times for the treated mice are expressed as a percentage of the control group performance time in the table.

The results obtained in the foregoing tests are expressed in the following table, wherein each test compound employed in designated by the particular Example hereof in which the compound is described.

| Compound employed | Dose (mg./kg. of body weight) | Photocell activity cage (percent of control) ± std. error | Rotorod (percent of control) |
|---|---|---|---|
| Example: | | | |
| 1 | 75 | 32 | 92 |
| 2 | 25 | 50±15 | (1) |
| 3 | 25 | 47 | 96 |
| 5 | 25 | 44±10 | 91 |
| 6 | 10 | 47±3 | 95 |
| 7 | 50 | 45±6 | 82 |
| 8 | 25 | 44±9 | 97 |
| 9 | 50 | 41±8 | 80 |
| 10 | 100 | 45±5 | 79 |
| 11 | 100 | 39 | 96 |
| 12 | 50 | 53±10 | 85 |

[1] Not run.

We claim:
1. A 3,4,5-trimethoxybenzamide of the nitrogen-con- taining compounds having one of the structural formulas

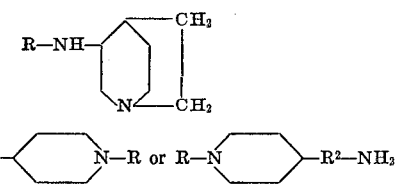

where R represents the 3,4,5-trimethoxybenzoyl radical and wherein $R^2$ represents an alkylene radical of 1 to 3 carbon atoms.

2. The compound as recited in claim 1 which is the 3,4,5-trimethoxybenzamide of 3-aminoquinuclidine.

3. The compound as recited in claim 1 which is the 3,4,5-trimethoxybenzamide of 4-(aminomethyl)-piperidine.

4. The compound as recited in claim 1 which is the 3,4,5-trimethoxybenzamide of 4-(aminomethyl)-piperidine.

References Cited

872,350   7/1961   Great Britain _____ 260—247.2

HENRY R. JILES, Primary Examiner

G. T. TODD, Assistant Examiner

U.S. Cl. X.R.

260—293.64, 293.73, 293.77, 559 R, 267, 324

UNITED STATES PATENT OFFICE
CERTIFICATE OF CORRECTION

Patent No. 3,702,324  Dated November 7, 1972

Inventor(s) Wilfred A. Skinner, John G. Johansson, and Howard L. Johnson

It is certified that error appears in the above-identified patent and that said Letters Patent are hereby corrected as shown below:

Cancel claim 4 of the patent (which, as printed, is identical to claim 3) and rewrite the same as follows to agree with the record in the Patent Office:

4. The compound as recited in claim 1 which is 3,4,5-trimethoxybenzamide of trimethylene-bis-4-piperidine.

Signed and sealed this 1st day of May 1973.

(SEAL)
Attest:

EDWARD M. FLETCHER, JR.  ROBERT GOTTSCHALK
Attesting Officer  Commissioner of Patents